United States Patent
Kanczuzewski et al.

(10) Patent No.: US 8,192,121 B1
(45) Date of Patent: Jun. 5, 2012

(54) CARGO RESTRAINT DEVICE

(75) Inventors: Thomas E. Kanczuzewski, South Bend, IN (US); John W. Doster, Granger, IN (US); John E. Townsend, Paw Paw, IN (US); Donald J. Nagy, South Bend, IN (US); James Doster, South Bend, IN (US)

(73) Assignee: Logistick, Inc., South Bend, IN (US)

( * ) Notice: Subject to any disclaimer, the term of this patent is extended or adjusted under 35 U.S.C. 154(b) by 0 days.

(21) Appl. No.: 12/948,529

(22) Filed: Nov. 17, 2010

(51) Int. Cl.
*B61D 45/00* (2006.01)

(52) U.S. Cl. .................. 410/152; 410/143; 410/151

(58) Field of Classification Search .............. 410/152, 410/151, 143, 144, 89, 46, 90, 91, 129; 248/357, 248/205.3, 214, 22.51, 222.12, 222.13
See application file for complete search history.

(56) References Cited

U.S. PATENT DOCUMENTS

| | | | |
|---|---|---|---|
| 969,002 A | 8/1910 | Teachout | |
| 1,401,419 A | 12/1921 | Mcnally | |
| 1,951,660 A | 3/1934 | Klaudt | |
| 2,124,082 A | 7/1938 | Reifer | |
| 2,414,160 A | 1/1947 | Moon | |
| 2,464,080 A | 3/1949 | Hankins | |
| 2,467,681 A | 4/1949 | McKinney | |
| 2,468,101 A | 4/1949 | Nampa | |
| 2,697,631 A | 12/1954 | Miller | |
| 2,752,864 A | 7/1956 | McDougal, Sr. et al. | |
| 2,766,704 A | 10/1956 | McMahon | |
| 2,845,245 A | 5/1958 | Gray et al. | |
| 2,912,939 A | 11/1959 | Miner, Jr. et al. | |
| 2,980,037 A | 4/1961 | Elsner | |
| 2,993,708 A | 7/1961 | Holman, Jr. | |
| 3,075,478 A * | 1/1963 | Elsner | 410/149 |
| 3,177,007 A | 4/1965 | Oren | |
| 3,344,750 A | 10/1967 | Kostrewa | |
| 3,367,286 A * | 2/1968 | Jantzen | 410/102 |
| 3,559,591 A | 2/1971 | Breen et al. | |
| 3,590,746 A | 7/1971 | Gibson | |
| 3,712,663 A | 1/1973 | Laven | |
| 3,836,174 A | 9/1974 | Holman, Jr. | |
| 3,995,565 A | 12/1976 | Kersey | |
| 4,026,508 A | 5/1977 | Ziegler | |
| 4,080,906 A | 3/1978 | Brown | |

(Continued)

FOREIGN PATENT DOCUMENTS

GB    1209255    10/1970

*Primary Examiner* — Stephen Gordon
*Assistant Examiner* — Sunsurraye Westbrook
(74) *Attorney, Agent, or Firm* — Barnes & Thornburg LLP (57) ABSTRACT

A device for engaging an elongated support for restraining cargo selectively in containers having different widths. The device comprising a strip, a sleeve including four walls extending generally perpendicularly from the top strip surface defining a first cavity. The sleeve having a rigid platform within the first cavity extending substantially parallel to and spaced from the top strip surface. A compressible insert receivable in the sleeve. The compressible insert including a separable portion to be removed for reducing the size of the compressible insert. The compressible insert may be comprised of foam, may have a block configuration and may be scored for facilitating removal of the separable portion of the compressible insert. The device may also include gussets. The device is configures to transfer to shear stress at least some of the tensile force applied by the elongated support. A method of restraining cargo with an elongated support selectively in containers having different internal widths using the device.

22 Claims, 4 Drawing Sheets

U.S. PATENT DOCUMENTS

| | | |
|---|---|---|
| 4,264,251 A | 4/1981 | Blatt |
| 4,278,376 A | 7/1981 | Hunter |
| 4,396,325 A | 8/1983 | Joice-Cavanagh |
| 4,432,678 A | 2/1984 | Liebel |
| 4,498,824 A | 2/1985 | Kinkle |
| 4,616,757 A | 10/1986 | Hobson |
| 4,700,918 A | 10/1987 | Andrasko, Jr. |
| D294,340 S | 2/1988 | Robson |
| 4,735,468 A | 4/1988 | Taylor, Jr. et al. |
| 4,756,498 A | 7/1988 | Frye |
| 4,830,558 A | 5/1989 | Sweeney |
| 4,846,610 A | 7/1989 | Schoenleben |
| 4,880,342 A | 11/1989 | Pradovic |
| 4,932,817 A | 6/1990 | Mattare |
| 4,955,771 A | 9/1990 | Bott |
| 4,962,907 A | 10/1990 | Gary |
| 4,982,922 A | 1/1991 | Krause |
| 5,028,184 A | 7/1991 | Krause |
| 5,156,110 A | 10/1992 | Fuller |
| 5,169,007 A | 12/1992 | McHendry |
| 5,219,251 A | 6/1993 | Kanczuzewski |
| 5,259,712 A | 11/1993 | Wayne |
| 5,281,063 A | 1/1994 | Austin, III |
| D344,482 S | 2/1994 | Arvidsson |
| 5,320,464 A | 6/1994 | Long et al. |
| 5,326,204 A | 7/1994 | Carlson et al. |
| 5,362,184 A | 11/1994 | Hull et al. |
| 5,370,482 A | 12/1994 | Long |
| 5,494,389 A | 2/1996 | Kanczuzewski |
| D382,533 S | 8/1997 | Okland |
| 5,688,087 A | 11/1997 | Stapleton et al. |
| 5,807,047 A | 9/1998 | Cox |
| D406,095 S | 2/1999 | Denny et al. |
| D422,554 S | 4/2000 | Stapleton et al. |
| 6,074,143 A * | 6/2000 | Langston et al. ............... 410/89 |
| 6,086,299 A | 7/2000 | Kanczuzewski |
| D438,022 S | 2/2001 | Bunn |
| D453,869 S | 2/2002 | Schultz et al. |
| D458,210 S | 6/2002 | Kanczuzewski et al. |
| 6,533,513 B2 | 3/2003 | Kanczuzewski et al. |
| 6,874,982 B2 | 4/2005 | Rhodes |
| D506,076 S | 6/2005 | Weisgerber |
| D537,405 S | 2/2007 | Saward |
| 7,334,973 B2 * | 2/2008 | Scott ............................ 410/151 |
| D571,279 S | 6/2008 | Trusty et al. |
| D589,709 S | 4/2009 | Edwards |
| 2010/0308091 A1 | 12/2010 | Hubbard |

* cited by examiner

CARGO RESTRAINT DEVICE

The present disclosure relates generally to a device and method for restraining cargo within a container.

BACKGROUND

Cargo transported for commercial and other uses is often shipped in semi-trailers or other trucks, railcars, ships, aircraft or other shipping vehicles. In most instances, shifting or translation of cargo within the shipping vehicle can occur during shipping which can lead to damage. U.S. Pat. Nos. 6,533,513, 6,086,299 and 5,494,389, disclose cargo retention devices that have been well received in the shipping industry. A pair of such cargo retention devices may be secured on opposed walls of the shipping vehicle, and an elongated support in the form of a wood beam or the like is positioned across the bed of the shipping vehicle and engaged with the cargo retention devices to secure cargo.

A problem associated with these devices may arise when the shipping vehicles have different internal widths. For example, the elongated support commonly used with these devices in semi-trailer applications is an 8' long 2"×4" wood beam, but the inside width of semi-trailers (i.e., the distance between the inside walls of the semi-trailers) may vary several inches. For example, the inside width of semi-trailers having insulated walls is typically in the range of about 98" to about 100½ and the inside width of semi-trailers not having insulated walls is typically in the range of about 100½" to about 102". A cargo restraint assembly that performs optimally for a semi-trailer of the smaller internal width is not likely to perform optimally for a semi-trailer of the greater internal width because, with the greater internal width, the elongated support is looser relative to the cargo restraint devices and the cargo restraint devices are therefore not able to as effectively transfer tensile force applied by the elongated support to shear stress.

SUMMARY

The present disclosure is directed to a device for engaging an elongated support for restraining cargo selectively in containers having different width. For example, the device may be used to restrain cargo selectively in a first container having a first internal width or a second container having a second internal width that is less than the first internal width and configured to transfer to shear stress at least some of the tensile force applied by the elongated support. The device may comprise a strip having a bottom strip surface having an adhesive disposed thereon for securing the device to a wall of the first container or to a wall of the second container, and a top strip surface; a sleeve including four walls extending from the top strip surface generally perpendicular to the strip surface defining a first cavity, the sleeve having a rigid platform within the first cavity surrounded by the four walls and extending substantially parallel to and spaced from the top strip surface, the platform defining within the first cavity a second cavity; and a compressible insert receivable in the second cavity, the compressible insert engaging the platform to define within the second cavity a third cavity for receiving an end of the elongated support, the compressible insert including a separable portion to be removed for reducing the size of the compressible insert and thereby increasing the size of the third cavity when being used to restrain cargo in the first container. The compressible insert may be comprised of foam, may have a block configuration and may be scored for facilitating removal of the separable portion of the compressible insert. The four walls and the platform may define a bore extending from the bottom surface of the strip to the platform. The device may also include gussets.

The present disclosure is also directed to a method of restraining cargo with an elongated support selectively in a first container having a first internal width or in a second container having a second internal width that is less than the first internal width. The method includes securing a cargo restraint device on a wall of the selected of the first or second container, the cargo restraint device comprising a strip having a bottom strip surface with an adhesive disposed thereon for securing to the wall of the selected of the first or second container and a top strip surface, a sleeve extending generally perpendicularly from the top strip surface, the sleeve having a platform substantially parallel to and spaced from the strip, the platform defining a first cavity, and a compressible insert having a block configuration and including a separable portion to be removed for reducing the size of the compressible insert, the compressible insert receivable in the first cavity to define within the first cavity a second cavity; removing the separable portion of the compressible insert if the selected of the first or second container is the first container; placing the compressible insert into the first cavity; and inserting an end of the elongated support into the second cavity so that the end engages the compressible insert and the compressible insert engages the platform and so that the cargo restraint device transfers at least some of the tensile force applied by the elongated support to shear stress. The method may also include securing an other cargo restraint device on the other wall of the selected of the first or second container in a like manner.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

Figure 1:
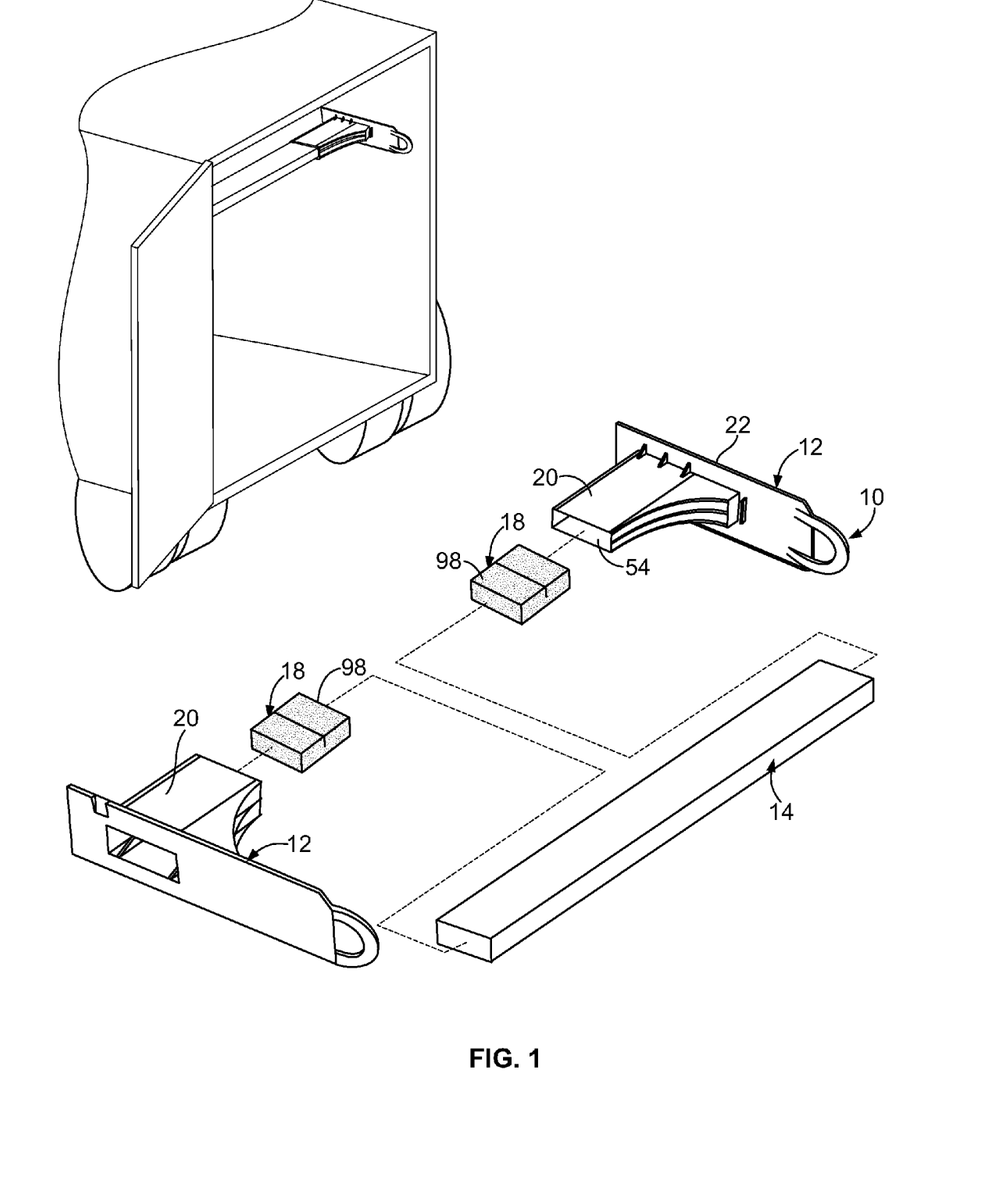
FIG. 1 is a partial view of a semi-trailer and a cargo restraint assembly in accordance with an illustrated embodiment of the present disclosure being used to restrain cargo in the semi-trailer, including an exploded view of the cargo restraint assembly.

FIG. 1 illustrates a cargo restraint assembly 10 restraining cargo in a container in the form of a semi-trailer. The cargo restraint assembly 10 includes a pair of cargo restraint devices 12 in accordance with an illustrated embodiment of the present disclosure and an elongated support 14. The pair of cargo restraint devices 12 is secured to opposed walls of the semi-trailer and is engaged with the elongated support 14, with the elongated support extending across the bed of the semi-trailer. The cargo restraint assembly 10 in accordance with the present disclosure is used for limiting the shifting of cargo being transported by or within the semi-trailer, or by or within any other shipping vehicle or other container, such as, for example, any type of truck, railcar, ship or aircraft or other shipping vehicle.

Each cargo restraint device 12 may have any suitable construction. As illustrated in FIGS. 1-6, for example, each cargo restraint device 12 in accordance with the illustrated embodiment of the present disclosure comprises generally a sleeve member 16 and a compressible insert 18. Each sleeve member 16 includes a sleeve 20, an elongated strip 22 having a bottom surface 24 and a top surface 26, a handle 28 disposed at an end of the strip 22, and a plurality of side gussets 32 and a plurality of end gussets 34 for adding strength and rigidity to the sleeve and transferring to shear stress at least some of the tensile force applied by the elongated support 14. Each cargo restraint device 12 may be constructed of any suitable material such as any suitable plastic or other material.

Each cargo restraint device may also include an adhesive 36 disposed on the bottom surface 24 for securing the bottom surface 24 to the wall of the semi-trailer. The adhesive 36 may be in any suitable form. The adhesive 36 may, for example, be in the form of an acrylic based or rubber based adhesive. A removable release liner may also be included. After removal of the release liner, the cargo restraint device 12 can be pressed against one of the walls of the semi-trailer to secure it to the wall. The adhesive 36 may be instead disposed directly on the rear surface, may be in the form of a two-sided tape with a removable release liner, or may be in any other suitable form.

The sleeve 20 extends from the top surface 26 generally perpendicular to the strip 22. The sleeve 20 comprises a pair of opposed side walls 40 and 42 and a pair of opposed end walls 50 and 52. The walls 40,42, 50 and 52 extend from the top surface 26 generally perpendicular to the strip 22 and define a cavity 54 sized and configured to receive an end of a 2"×4". The sleeve 20 also includes a platform 60 extending generally parallel to the strip 22 and spaced from the strip approximately 1-¼" or any other suitable distance. The platform 60 defines an aperture 62 for providing easy access to the compressible insert 18 during assembly of the cargo restraint assembly 10 and to reduce manufacturing costs. The walls 40, 42, 50 and 52 surround the platform. The walls 40, 42, 50 and 52 and the platform 60 define within the cavity 54 a cavity 64 for receiving the compressible insert 18 and the elongated support 14. The inside of the end wall 50 includes a pair of tabs 66 extending the height of the cavity 64 for engaging the compressible insert 18 to retain it within the cavity 64.

Figure 2:
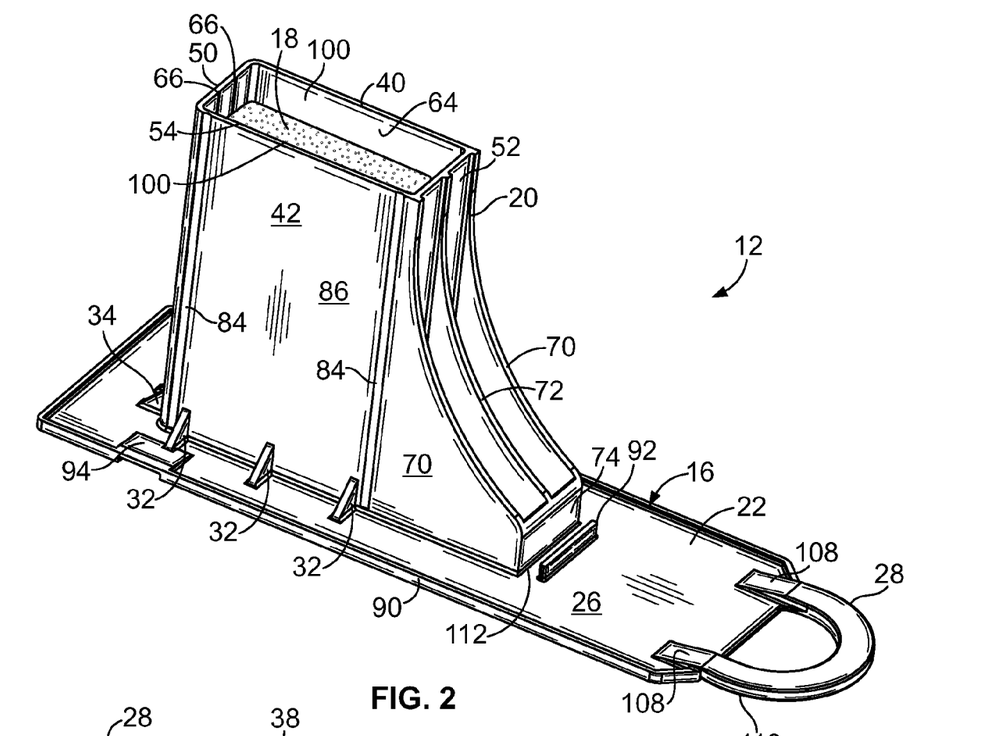
FIG. 2 is a top perspective view of one of the cargo restraint devices of FIG. 1.
Figure 6:
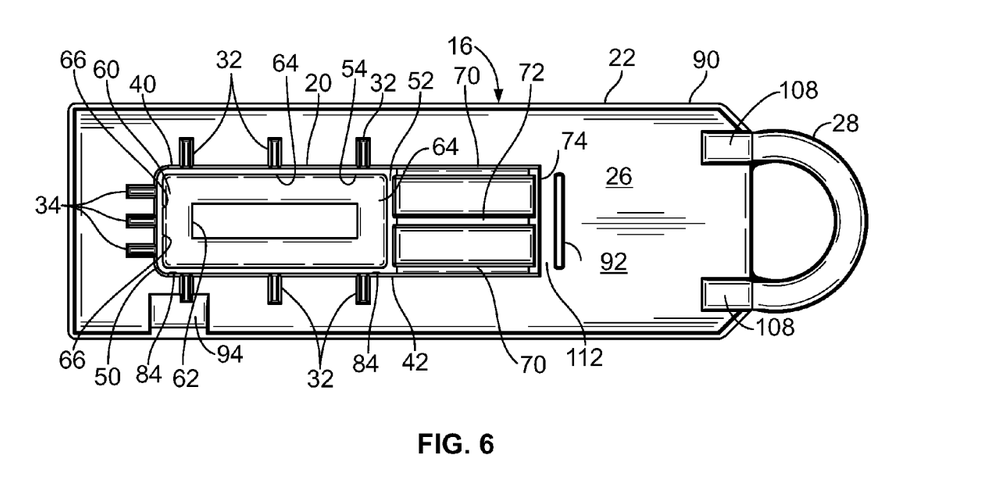
FIG. 6 is a top plan view of the sleeve member of the cargo restraint device of FIG. 2.

A pair of arcuate gussets 70 extend from the side walls 40 and 42 of the sleeve from the end wall 52 towards the top surface 26 of the strip 22. Each arcuate gusset 70 and a respective side wall 40 and 42 are collinear. The sleeve 20 also includes an additional arcuate gusset 72 disposed between the pair of arcuate gussets 70. The gussets 70 and 72 extend parallel to each other and terminate at a boundary wall 74. The gussets 70 and 72 add strength and rigidity to the sleeve 20 and transfer to shear stress at least some of the tensile force applied by the elongated support 14.

Figure 3:
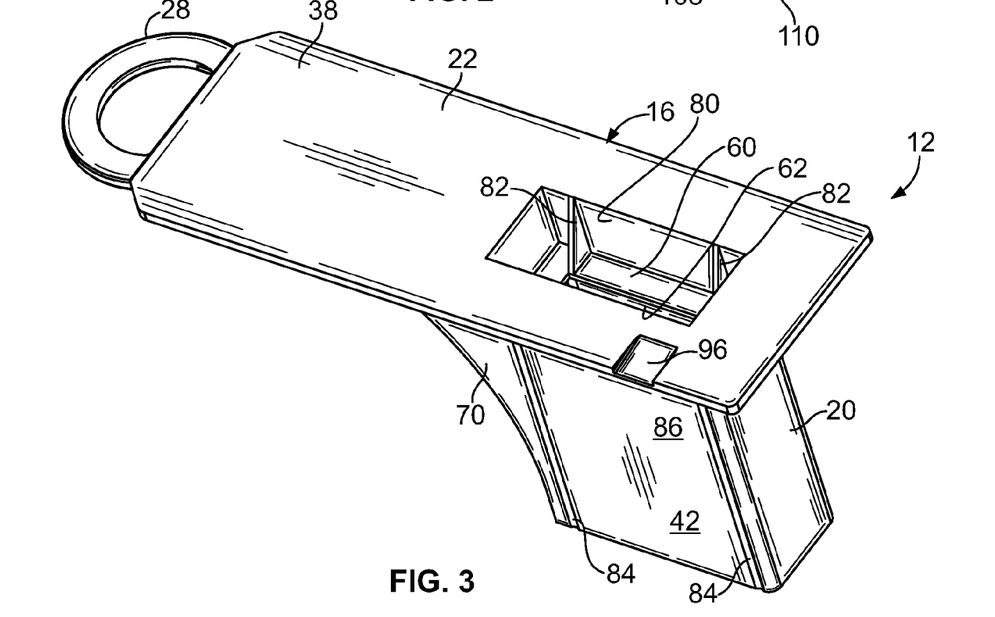
FIG. 3 is a bottom perspective view of the cargo restraint device of FIG. 2.
Figure 4:
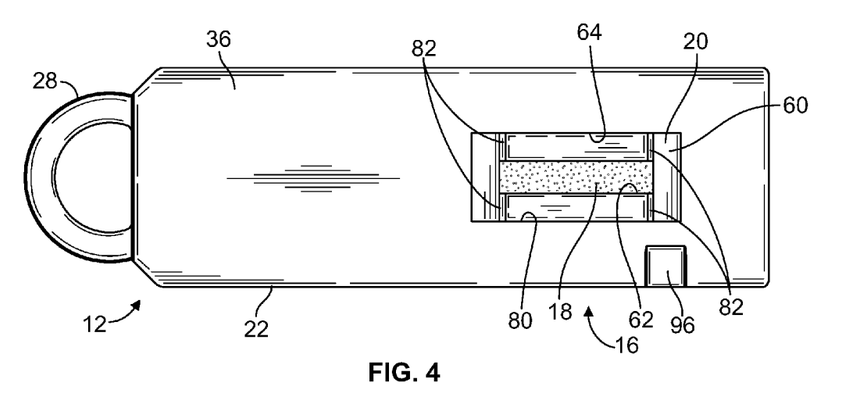
FIG. 4 is bottom plan view of the cargo restraint device of FIG. 2.
Figure 5:
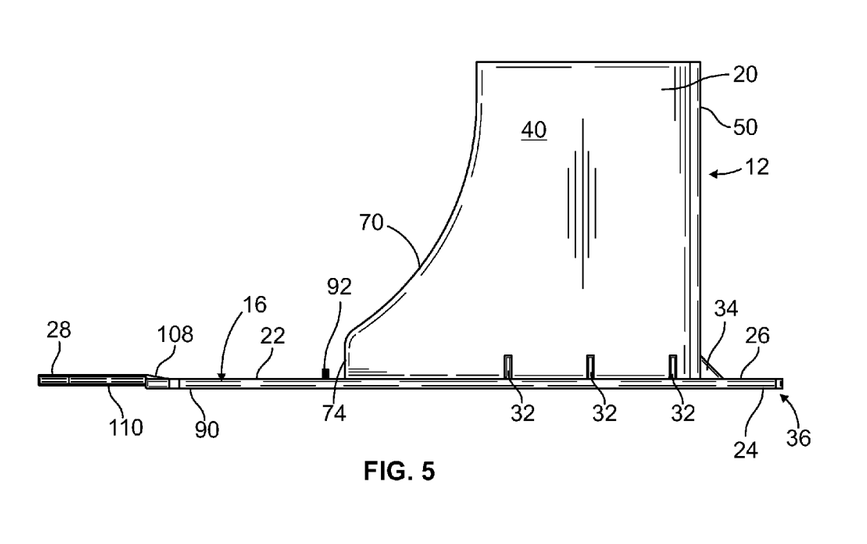
FIG. 5 is a side plan view of the cargo restraint device of FIG. 2.

The platform 60, the strip 22 and the walls 40, 42, 50 and 52 define a bore 80 opposite the cavity 64. A plurality of internal gussets 82 extend with the bore 80 on an angle from the side walls 40 and 42 to the platform 60 to add strength and rigidity to the sleeve 20 and transfer to shear stress at least some of the tensile force applied by the elongated support 14.

The side wall 42 includes a pair of lines of reduced thickness 84 that extend generally perpendicular to the strip 22 and define a frangible portion 86. The lines 84 extend generally parallel to each other and are spaced relative to each other. The lines 84 enable the frangible portion 86 to be readily broken to facilitate removal of the cargo restraint device 12 after use. For example, a tool such as a crow bar or other tool can be inserted into the cavity 64 adjacent the elongated support 14 to break the frangible portion 86.

Figure 7:
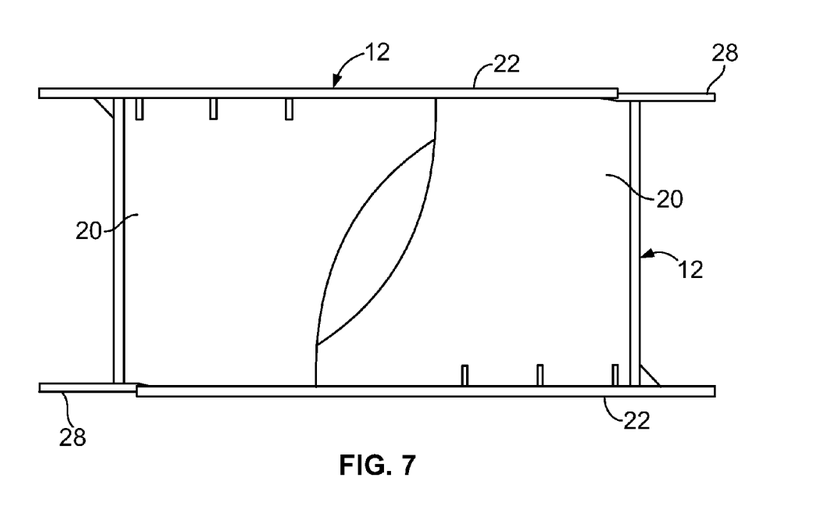
FIG. 7 is a perspective view of a pair of the cargo restraint devices of FIG. 1 stacked together.

The strip 22 includes a rail 90 extending substantially about its perimeter also to add strength and rigidity to the strip 22 and transfer at least some of the tensile force applied by the elongated support 14 to shear stress. The strip 22 also includes a lip 92 on its top surface 26 for providing stackability of two cargo restraint devices 12 as shown in FIG. 7 and as described in more detail below.

The strip 22 also includes a raised surface 94 that defines a pry slot 96 for facilitating removal of the cargo restraint device 12. After use, any suitable tool can be inserted into the pry slot 96 and upon application of force the cargo restraint device 12 can be separated readily from the wall of the semi-trailer.

The compressible insert 18 may be constructed of any suitable material and may have any suitable configuration and dimensions. The illustrated compressible insert 18 is constructed of foam. The compressible insert 18 is sized to be received snugly within the cavity 64 and thus may have a cross section having dimensions substantially the same as the dimensions of the cross section of a 2"×4" or other elongated support. The compressible insert 18 may have a height of 3-¾" or may have any other suitable height. The compressible insert 18 may have a generally rectangular block configuration with six flat sides. The compressible insert 18 may have any other configuration, including, for example, any other block configuration, and any other suitable dimensions in accordance with other embodiments of the present disclosure.

When the compressible insert 18 is received by the cavity 64, it defines within cavity 64 a cavity 100 for receiving the end of the elongated support 14. The compressible insert 18 is scored about its perimeter to form a separable portion 98 of the compressible insert 18 that can be readily removed to reduce the height of the insert 18 and thereby increase the size of the cavity 100. Thus the intact compressible insert 18 can be used in semi-trailers or other containers with a certain internal width and the shortened compressible insert can be used in semi-trailers or other containers having a slightly greater internal width. The insert 18 may include any other suitable structure for forming a removable portion in accordance with other embodiments of the present disclosure.

The gussets 32 and 34 may have any suitable configuration and any suitable number. The illustrated gussets 32 extend on an angle from the respective side wall 40 and 42 to the strip 22. The illustrated gussets 34 extend on an angle from the end wall 50 to the strip 22. The gussets 32 and 34 add strength and rigidity to the cargo restraint device 12 and transfer to shear stress at least some of the tensile force applied by the elongated support 14.

The handle 28 is disposed at one end of the strip 22 and is configured to facilitate manual removal of the cargo restraint device 12 from the wall of the semi-trailer after use. The handle 28 has a semi-circular construction. The handle 28 is joined to the strip 22 by a pair of bosses 108 that have a sloping top surface. The handle 28 extends generally parallel to the strip 22 and the handle and strip 22 and the wall define an opening 110 to facilitate manual grasping of the cargo restraint device 12 when it is secured to a wall for removal from the wall.

The cargo restraint device 12 in accordance with the illustrated embodiment of the present disclosure provides many benefits. With its design, the cargo restraint device 12 is better able to transfer at least some of the tensile force imposed by the elongated support to shear stress and to withstand the shear stress.

The cargo restraint assembly 10 is also more effective than prior art products because it can perform well in semi-trailers or other containers of different sized internal widths. Because of the design of cargo restraint devices 12, the cargo restraint assembly 10 is better able to withstand the loads imposed by the elongated support 14 during installation and during cargo transport in trucks having different internal widths. For example, the raised platform 60 with the gussets 82 provide a structure that effectively transfers at least some of the tensile force of the elongated support 14 to shear stress and also increases the shear strength of the cargo restraint device 12. The gussets 70 and 72 also provide similar benefit.

Further, the ability to remove a portion of the compressible insert 18 to shorten its height enables the cargo restraint devices 12 to continue to be effective in transferring this tensile force to shear stress when a wider semi-trailer is used without having to change the size of the elongated support 14. For example, in application, as relating to semi-trailers, the compressible insert 18 can have a height of about 3-¾" and can have a score around some or all the perimeter half way of its height (see, e.g., FIG. 1). For semi-trailers having an internal width of about 98" to 100½", the compressible insert 18 can be used with its full height. For semi-trailers having an internal width of about 100½" to 102", a half portion of the compressible insert 18 can be removed to accommodate the greater internal width.

Accordingly, the cargo restraint assembly 10 in accordance with an embodiment of the present disclosure also includes a method of restraining cargo selectively in semi-trailers or other containers of different widths with an elongated support. For example, the method may include restraining cargo selectively in a first container having a first internal width or in a second container having a second internal width that is less than the first internal width. The method includes securing the cargo restraint device 12 on the wall of the selected of the first or second container, the cargo restraint device comprising the strip 22 having the bottom surface 24 having the adhesive 38 disposed therein for securing to the wall of the selected of the first or second container and the top surface 26, the sleeve 20 extending generally perpendicularly from the top surface, the sleeve having the platform 60 substantially parallel to and spaced from the strip, the platform defining a first cavity, and the compressible insert 18 having a block configuration and including a separable portion to be removed for reducing the size of the compressible insert, the compressible insert receivable in the first cavity to define within the first cavity a second cavity; removing the separable portion of the compressible insert if the selected of the first or second container is the first container; placing the compressible insert into the first cavity; and inserting the end of the elongated support 14 into the second cavity so that the end engages the compressible insert and the compressible insert engages the platform and so that the cargo restraint device transfers to shear stress at least some of the tensile force of the elongated support. The method may also include securing the other cargo restraint device on the other wall of the selected of the first or second container in a like manner. The steps of the method in accordance with the present disclosure may be performed in any order and with or without additional steps.

The cargo restraint device 12 in accordance with the illustrated embodiment of the present disclosure also provides stackability benefits for storage purposes as illustrated in FIG. 7 where two cargo restraint devices 12 are shown stacked together. For stacking purposes, each of the two cargo restraint devices 12 are inverted relative to each other, and each of the lips 92 is received within the cavity 54 of the other cargo restraint device, with the lead end of the wall 52 of the each cargo restraint device being received by a gap 112 defined by the boundary wall 74 and the lip 92 of the other cargo restraint device.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A device for engaging an elongated support for restraining cargo selectively in a first container having a first width or a second container having a second width that is less than the first width and configured to transfer to shear stress at least some of the tensile force applied by the elongated support, the device comprising:
 a strip having a bottom strip surface with an adhesive disposed thereon for securing the device selectively to a wall of the first container or to a wall of the second container, and a top strip surface;
 a sleeve including four walls extending from the top strip surface generally perpendicular to the top strip surface defining a first cavity, the sleeve having a rigid platform within the first cavity surrounded by the four walls and extending substantially parallel to and spaced from the top strip surface, the platform defining within the first cavity a second cavity; and
 a compressible insert receivable in the second cavity, the compressible insert engaging the platform to define within the second cavity a third cavity for receiving an end of the elongated support, the compressible insert including a separable portion to be removed for reducing the size of the compressible insert and thereby increasing the size of the third cavity when being used to restrain cargo in the first container.

2. The device of claim 1 wherein the compressible insert has a block configuration.

3. The device of claim 1 wherein the compressible insert is scored to facilitate removal of the separable portion of the compressible insert.

4. The device of claim 1 wherein the compressible insert is comprised of foam.

5. The device of claim 1 wherein the platform defines an aperture for providing access to the compressible insert.

6. The device of claim 1 wherein the strip defines a pry slot to facilitate removal of the device from the wall.

7. The device of claim 1 wherein at least one of the four walls includes a frangible portion to facilitate breakage of the container to remove the elongated support.

8. The device of claim 1 wherein at least one of the four walls includes a pair of lines of reduced thickness for facilitating breakage of the device to remove the elongated support from the device.

9. The device of claim 1 wherein the four walls and the platform define a bore extending from the bottom surface of the strip to the platform.

10. The device of claim 9 wherein the sleeve further includes a plurality of gussets within the bore interconnecting the four walls and the platform for transferring to shear stress at least some of the tensile force applied by the elongated support.

11. The device of claim 1 wherein the sleeve includes a plurality of parallel gussets for transferring to shear stress at least some of the tensile force applied by the elongated support.

12. The device of claim 11 wherein there are three gussets, one gusset being disposed between the other two gussets, and wherein two of the four walls are parallel to each other, each of said other two gussets being collinear with a respective one of said two of the four walls.

13. The device of claim 12 wherein the gussets are arcuate.

14. The device of claim 1 wherein the sleeve includes a tab adjacent the platform for engaging the compressible insert.

15. The device of claim 1 further including a handle associated with an end of the strip to facilitate removal of the device from the wall of the first or second container.

16. The device of claim 15 wherein the handle and the strip define a bore when the device is secured to the wall of the first container or second container to facilitate manual grasping of the handle.

17. A device for engaging an elongated support for restraining cargo selectively in a first container having a first width or a second container having a second width that is less than the first width and configured to transfer to shear stress at least some of the tensile force applied by the elongated support, the device comprising:
 a strip having a bottom strip surface with an adhesive disposed thereon, the bottom strip surface securable selectively to a wall of the first container or to a wall of a second container, and a top strip surface;
 a sleeve including four walls extending from the top strip surface generally perpendicular to the top strip surface defining a first cavity, the sleeve having a rigid platform within the first cavity surrounded by the four walls and extending substantially parallel to and spaced from the top strip surface, the platform defining within the first cavity a second cavity; and
 a compressible insert comprising a foam block receivable in the second cavity, the foam block engaging the platform to define within the second cavity a third cavity for receiving an end of the elongated support, the foam block being scored to form a separable portion to be removed for reducing the size of the foam block and thereby increasing the size of the third cavity when being used to restrain cargo in the first container.

18. The device of claim 17 wherein the platform defines an aperture for providing access to the compressible insert.

19. A method of restraining cargo with an elongated support selectively in a first container having a first internal width or in a second container having a second internal width that is less than the first internal width, the method including:
 securing a cargo restraint device on a wall of the selected of the first or second container, the cargo restraint device comprising a strip having a bottom strip surface having an adhesive disposed therein for securing to the wall of the selected of the first or second container and a top strip surface, a sleeve extending generally perpendicularly from the top strip surface, the sleeve having a platform substantially parallel to and spaced from the strip, the platform defining a first cavity, and a compressible insert having a block configuration and including a separable portion to be removed for reducing the size of the compressible insert, the compressible insert receivable in the first cavity to define within the first cavity a second cavity;
 removing the separable portion of the compressible insert if the selected of the first or second container is the first container;
 placing the compressible insert into the first cavity; and
 inserting an end of the elongated support into the second cavity so that the end engages the compressible insert and the compressible insert engages the platform and so that the cargo restraint device transfers to shear stress at least some of the tensile force of the elongated support.

20. The method of claim 19 further including:
 securing an other cargo restraint device on an other wall of the selected of the first or second container, the other cargo restraint device comprising a strip having a bottom strip surface having an adhesive disposed therein for securing to the other wall of the selected of the first or second container and a top strip surface, a sleeve extending generally perpendicularly from the top strip surface, the sleeve having a platform substantially parallel to and spaced from the strip, the platform defining a first cavity, and a compressible insert having a block configuration and including a separable portion to be removed for reducing the size of the compressible insert, the compressible insert receivable in the first cavity to define within the first cavity a second cavity;
 removing the separable portion of the compressible insert of the other cargo restraint device if the selected of the first or second container is the first container;
 placing the compressible insert of the other cargo restraint device into the first cavity of the other cargo restraint device; and
 inserting an other end of the elongated support into the second cavity of the other cargo restraint device so that the end of the other cargo restraint device engages the compressible insert of the other cargo restraint device and the compressible insert of the other cargo restraint device engages the platform of the other cargo restraint device and so that the other cargo restraint device transfers to shear stress at least some of the tensile force of the elongated support.

21. A device for engaging an elongated support for restraining cargo selectively in a first container having a first width or a second container having a second width that is less than the first width and configured to transfer to shear stress at least some of the tensile force applied by the elongated support, the device comprising:
 a strip having a bottom strip surface with an adhesive disposed thereon for securing the device selectively to a wall of the first container or to a wall of the second container, and a top strip surface;

a sleeve including first cavity surrounded by the four walls extending from the top strip surface generally perpendicular to the top strip surface defining a cavity; and a compressible insert receivable in the cavity, the compressible insert including a separable portion to be removed for reducing the size of the compressible insert and thereby increasing the size of the cavity when being used to restrain cargo in the first container.

22. The device of claim 21 wherein the compressible insert is scored to facilitate removal of the separable portion of the compressible insert.

\* \* \* \* \*